(12) United States Patent
Deng et al.

(10) Patent No.: US 9,454,827 B2
(45) Date of Patent: Sep. 27, 2016

(54) SYSTEMS, DEVICES AND METHODS FOR TRACKING OBJECTS ON A DISPLAY

(71) Applicant: QUALCOMM Incorporated, San Diego, CA (US)

(72) Inventors: Fan Deng, San Diego, CA (US); Ming Yan, San Diego, CA (US); Lei Ma, San Diego, CA (US); Dashan Gao, San Diego, CA (US); Xin Zhong, San Diego, CA (US); Shizhong Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/185,695

(22) Filed: Feb. 20, 2014

(65) Prior Publication Data
US 2015/0063632 A1 Mar. 5, 2015

Related U.S. Application Data

(60) Provisional application No. 61/870,736, filed on Aug. 27, 2013, provisional application No. 61/870,724, filed on Aug. 27, 2013.

(51) Int. Cl.
*G06K 9/36* (2006.01)
*G06T 7/20* (2006.01)
(Continued)

(52) U.S. Cl.
CPC ............. *G06T 7/2053* (2013.01); *G06T 5/007* (2013.01); *G06T 5/009* (2013.01); *G06T 7/004* (2013.01);
(Continued)

(58) Field of Classification Search
CPC ..... G06T 7/2053; G06T 7/004; G06T 5/009; G06T 5/007; G06T 2207/20024; G06T 2207/20224; G06T 2207/10016; G06T 2207/20076

USPC .......................................... 382/103, 254, 274
See application file for complete search history.

(56) References Cited

U.S. PATENT DOCUMENTS 7,952,614 B2   5/2011   Lee
8,224,029 B2   7/2012   Saptharishi et al.
(Continued)

FOREIGN PATENT DOCUMENTS

| AU | 2009230796 A1 | 5/2011 |
| EP | 2107798 A1 | 10/2009 |
| JP | 2002259975 A | 9/2002 |

OTHER PUBLICATIONS

Sayed et al., "An Efficient Intensity Correction Algorithm for High Definition Video Surveillance Applications", IEEE Transactions on Circuits and Systems for Video Technology, vol. 21, No. 11, Nov. 2011, pp. 1622-1630.*

(Continued)

*Primary Examiner* — Brian P Werner
(74) *Attorney, Agent, or Firm* — Heejong Yoo

(57) ABSTRACT

Systems, devices and methods for improved tracking with an electronic device are disclosed. The disclosures employ advanced exposure compensation and/or stabilization techniques. The tracking features may therefore be used in an electronic device to improve tracking performance under dramatically changing lighting conditions and/or when exposed to destabilizing influences, such as jitter. Historical data related to the lighting conditions and/or to the movement of a region of interest containing the tracked object are advantageously employed to improve the tracking system under such conditions.

24 Claims, 10 Drawing Sheets

(51) Int. Cl.
*G06T 5/00* (2006.01)
*G06T 7/00* (2006.01)

(52) U.S. Cl.
CPC ........... *G06T 2207/10016* (2013.01); *G06T 2207/20024* (2013.01); *G06T 2207/20076* (2013.01); *G06T 2207/20224* (2013.01)

(56) References Cited

U.S. PATENT DOCUMENTS

| | | | |
|---|---|---|---|
| 8,249,299 B1 | 8/2012 | Dhawan et al. | |
| 8,310,665 B2 | 11/2012 | Hamamatsu et al. | |
| 8,483,437 B2 | 7/2013 | Shamaie | |
| 8,531,535 B2 | 9/2013 | Kwatra et al. | |
| 8,761,497 B2* | 6/2014 | Berkovich et al. | 382/155 |
| 2003/0035051 A1* | 2/2003 | Cho et al. | 348/169 |
| 2005/0073585 A1* | 4/2005 | Ettinger et al. | 348/155 |
| 2005/0265626 A1* | 12/2005 | Endo et al. | 382/274 |
| 2010/0014775 A1* | 1/2010 | Ikeda | 382/274 |
| 2011/0090345 A1 | 4/2011 | Ishii et al. | |
| 2011/0135154 A1* | 6/2011 | Wedge | 382/103 |
| 2013/0113941 A1 | 5/2013 | Yoneyama | |

OTHER PUBLICATIONS

International Search Report and Written Opinion—PCT/US2014/051736—ISA/EPO—Dec. 8, 2014.

Sayed M S., et al., "An Efficient Intensity Correction Algorithm for High Definition Video Surveillance Applications", IEEE Transactions on Circuits and Systems for Video Technology, IEEE Service Center, Piscataway, NJ, US, vol. 21, No. 11, Nov. 1, 2011, pp. 1622-1630, XP011480350.

\* cited by examiner

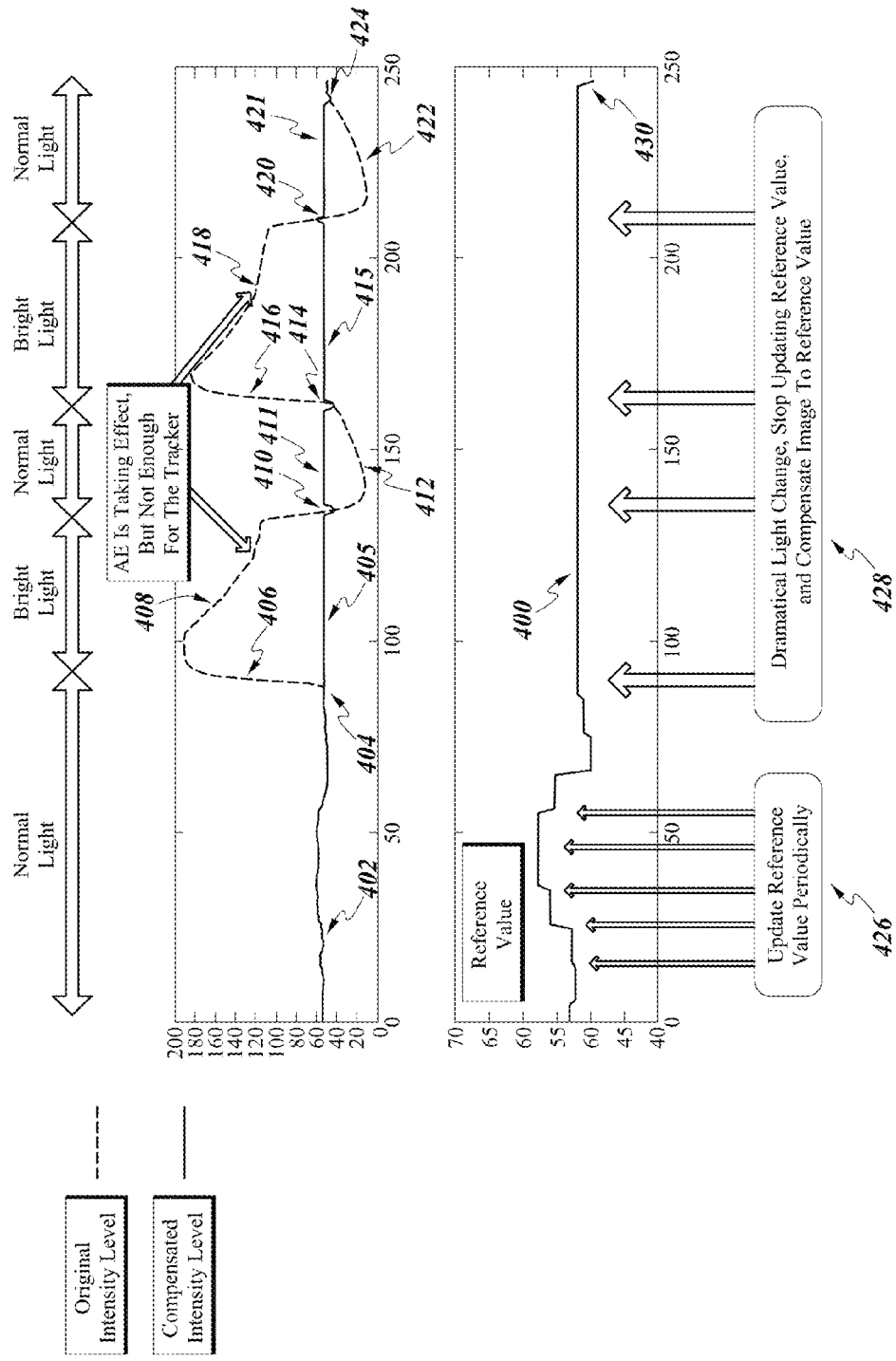

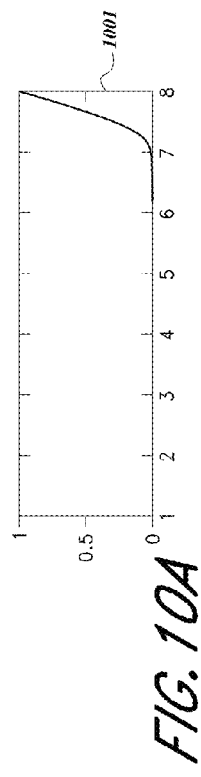
FIG. 10A
FIG. 10B
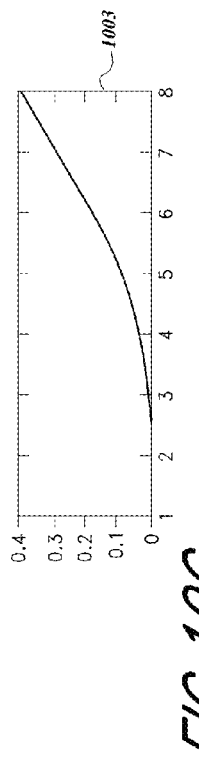
FIG. 10C
FIG. 10D
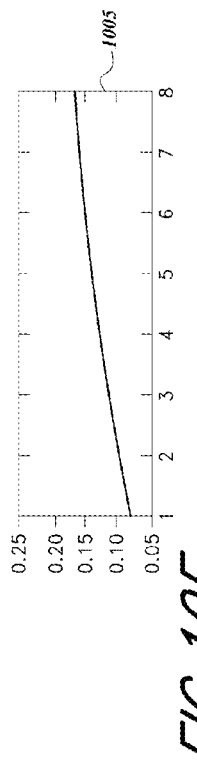
FIG. 10E
FIG. 10F
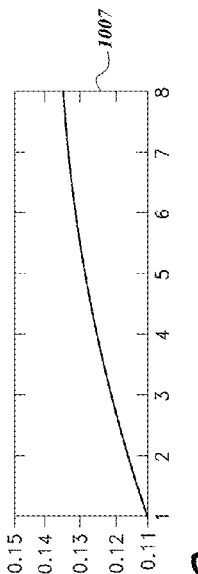
FIG. 10G
FIG. 10H

SYSTEMS, DEVICES AND METHODS FOR TRACKING OBJECTS ON A DISPLAY

CROSS-REFERENCE TO RELATED APPLICATIONS

This application claims the benefit of U.S. Provisional Patent Application No. 61/870,736, filed Aug. 27, 2013, entitled EXPOSURE COMPENSATION FOR TRACKING SYSTEM, and claims the benefit of U.S. Provisional Patent Application No. 61/870,724, filed Aug. 27, 2013, entitled STABILIZATION SYSTEM FOR CAMERA TRACKING SYSTEM, the disclosure of each of which is incorporated herein by reference in its entirety.

BACKGROUND

1. Field of the Invention

This disclosure relates generally to systems and methods of tracking objects captured by a digital image sensor. In particular, systems and methods of tracking objects with video recording devices are disclosed.

2. Description of the Related Art

With the advent of inexpensive and smaller recording systems, the recording industry is growing. More and more people enjoy recording objects in their environment using digital recording systems such as video cameras and mobile devices. The recordings can be used in a variety of applications, for instance for professional uses, for fun and pleasure, or for recording sentimental memories. Given the vast number of uses of recordings, more features and capabilities of these recording devices are desirable.

One of the features that digital recording systems may therefore have are tracking systems that can track on object in its field of view. For instance, U.S. Pat. Nos. 8,483,437; 8,310,665; 8,249,299; and 8,224,029, the contents of each of which are incorporated herein in their entirety, disclose recording systems for tracking objects. However, for some uses of recording systems, the ability for stable tracking of objects being captured under dramatically changing lighting conditions is needed. For example, a user may track a soccer player as the player is running down the field from bright to shaded areas. Conventional tracking systems operating under such conditions may not perform optimally as their tracking systems struggle to remain locked on a target moving from bright to darker areas. For instance, conventional auto exposure systems are typically used to adjust to these changes in lighting. However, these systems may not respond to dramatic changes in light quick enough to maintain a lock on a target object in a scene and therefore may not be optimal for use in recording systems with tracking capabilities.

Further, some conventional tracking systems may have difficulty distinguishing between true movement of an item being tracked versus apparent movement that is actually due to noise in the system, such as from shaking of the recording device.

SUMMARY

Embodiments of a method of tracking an object captured in a scene of interest with an electronic device are disclosed. In some embodiments, the method comprises determining an average light intensity of pixels in a region of a first image frame comprising the object; determining an average light intensity of pixels in the region of a second image frame comprising the object; comparing the determined average light intensities for the region in the first and second image frames; adjusting the intensity of pixels in the second image frame when a change in the average light intensity of pixels in the region is greater than an intensity limit; and tracking the object using the pixels in the second image frame.

In some embodiments, the adjusting comprises defining a reference value as the average light intensity of pixels in the region of the first image frame comprising the object.

In some embodiments, the change in the average light intensity of pixels in the region comprises the difference between the reference value and the average light intensity of pixels in the region of the second image frame.

In some embodiments, the adjusting comprises subtracting the difference from every pixel of the second image frame.

In some embodiments, the method further comprises periodically redefining the reference value, as the average light intensity of pixels in the region of the second image frame, if the difference is less than an intensity limit.

In some embodiments, the tracking the object comprises calculating a variation indicator of the region based on current and historical parameters of the region.

In some embodiments, the tracking the object further comprises calculating a confidence level based on comparison of the variation indicator with the historical parameters.

In some embodiments, the method further comprises passing the second image frame to the tracking system when the confidence level is greater than a specified confidence threshold.

In some embodiments, the current and historical parameters comprise, respectively, current and historical sizes of the region.

In some embodiments, the current and historical parameters comprise, respectively, current and historical locations of the region.

Several embodiments of a system for tracking an object with an electronic device are disclosed. In some embodiments, the system comprises a processor configured to determine an average light intensity of pixels in a region of a first image frame comprising the object; determine an average light intensity of pixels in the region of a second image frame comprising the object; compare the determined average light intensities for the region in the first and second image frames; adjust the intensity of pixels in the second image frame when a change in the average light intensity of pixels in the region is greater than an intensity limit; and track the object using the pixels in the second image frame.

In some embodiments, the adjusting comprises defining a reference value as the average light intensity of pixels in the region of the first image frame comprising the object, wherein the change in the average light intensity of pixels in the region comprises the difference between the reference value and the average light intensity of pixels in the region of the second image frame.

In some embodiments, the adjusting further comprises subtracting the difference from every pixel of the second image frame.

In some embodiments, the processor is further configured to periodically redefine the reference value, as the average light intensity of pixels in the region of the second image frame, if the difference is less than an intensity limit.

In some embodiments, the tracking the object comprises calculating a variation indicator of the region based on current size and location of the region and historical size and location of the region.

In some embodiments, the tracking the object further comprises calculating a confidence level based on comparison of the variation indicator with the historical size and location of the region.

In some embodiments, the system further comprises passing the second image frame to the tracking system when the confidence level is greater than a specified confidence threshold.

In some embodiments, a system for tracking an object with an electronic device comprises means for determining an average light intensity of pixels in a region of a first image frame comprising the object; means for determining an average light intensity of pixels in the region of a second image frame comprising the object; means for comparing the determined average light intensities for the region in the first and second image frames; means for adjusting the intensity of pixels in the second image frame when a change in the average light intensity of pixels in the region is greater than an intensity limit; and means for tracking the object using the pixels in the second image frame.

In some embodiments, the means for adjusting comprises defining a reference value as the average light intensity of pixels in the region of the first image frame comprising the object, wherein the change in the average light intensity of pixels in the region comprises the difference between the reference value and the average light intensity of pixels in the region of the second image frame.

In some embodiments, the means for adjusting further comprises means for subtracting the difference from every pixel of the second image frame.

In some embodiments, the system further comprises means for periodically redefining the reference value, as the average light intensity of pixels in the region of the second image frame, if the difference is less than an intensity limit.

In some embodiments, the means for tracking the object comprises means for calculating a variation indicator of the region based on current size and location of the region and historical size and location of the region.

In some embodiments, the means for tracking the object further comprises means for calculating a confidence level based on comparison of the variation indicator with the historical size and location of the region; and means for passing the second image frame to the tracking system when the confidence level is greater than a specified confidence threshold.

Several embodiments of a non-transitory computer readable medium configured to store instructions that when executed by a processor perform a method for tracking an object with an electronic device are disclosed. In some embodiments, the method comprises determining an average light intensity of pixels in a region of a first image frame comprising the object; determining an average light intensity of pixels in the region of a second image frame comprising the object; comparing the determined average light intensities for the region in the first and second image frames; adjusting the intensity of pixels in the second image frame when a change in the average light intensity of pixels in the region is greater than an intensity limit; and tracking the object using the pixels in the second image frame.

In some embodiments, the method of the computer readable medium further comprising defining a reference value equal as the average light intensity of pixels in the region of the first image frame comprising the object, wherein the change in the average light intensity of pixels in the region comprises the difference between the reference value and the average light intensity of pixels in the region of the second image frame.

In some embodiments, the method of the computer readable medium further comprises subtracting the difference from every pixel of the second image frame.

In some embodiments, the method of the computer readable medium further comprises periodically redefining the reference value, as the average light intensity of pixels in the region of the second image frame, if the difference is less than an intensity limit.

In some embodiments, the method of the computer readable medium further comprises calculating a variation indicator of the region based on current size and location of the region and historical size and location of the region.

In some embodiments, the method of the computer readable medium further comprises calculating a confidence level based on comparison of the variation indicator with the historical size and location of the region; and passing the second image frame to the tracking system when the confidence level is greater than a specified confidence threshold.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIGS. 4A-4B are charts showing embodiments of changing lighting intensity levels and corresponding compensated intensity levels and changes in reference values.

FIGS. 10A-H are line graphs showing one embodiment of the results of using a computational tool for determining a gain value.

DETAILED DESCRIPTION

Figure 1:
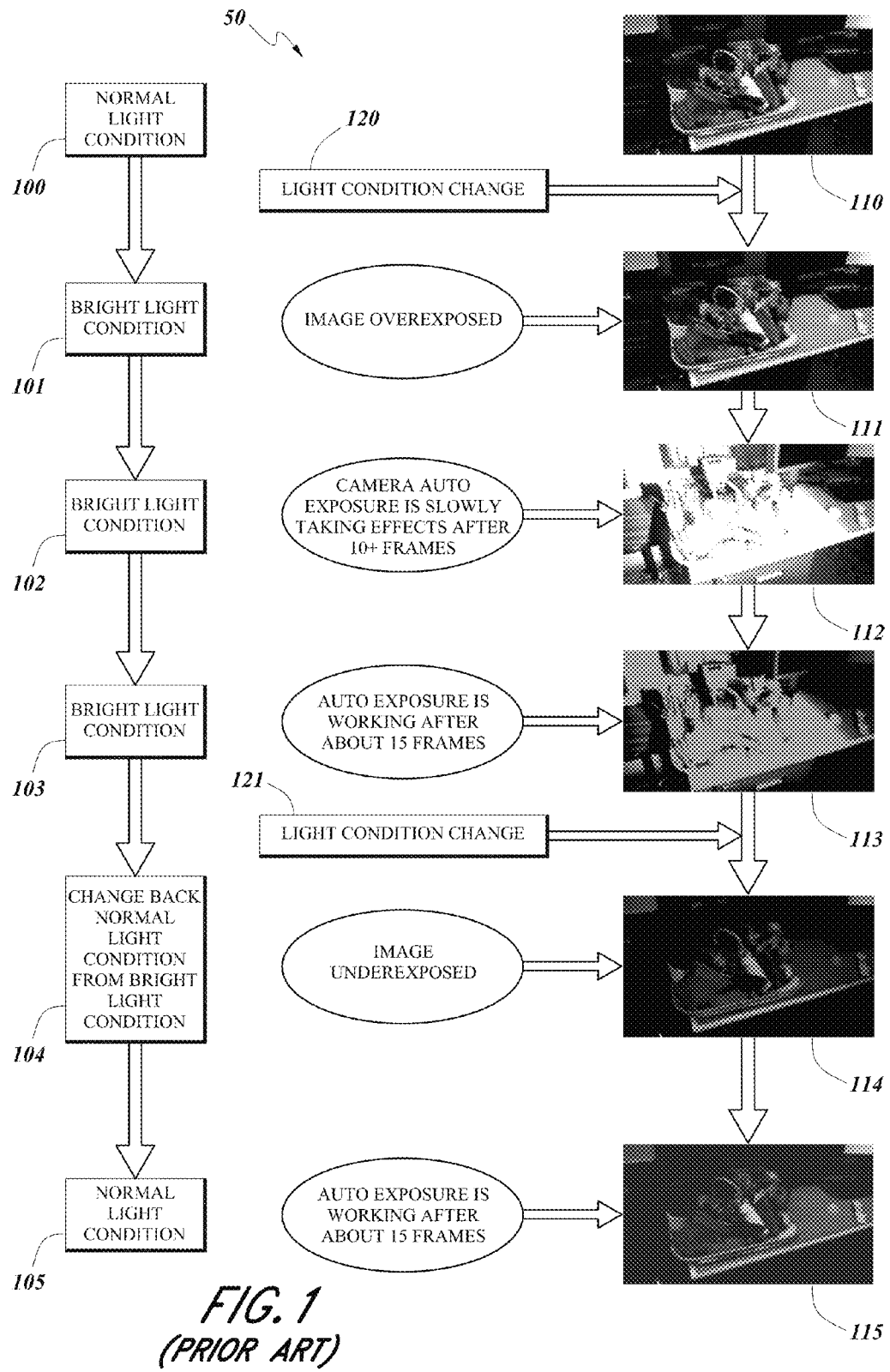
FIG. 1 depicts an embodiment of a conventional auto exposure process and the resulting image frames produced thereby.

The following detailed description is directed to certain specific embodiments of the development as described with reference to FIGS. 1-7. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Systems, devices and methods for tracking objects in a scene of interest captured by a digital imaging device are described. For example, one may wish to track one particular player in a sporting event as the game is being played. That allows the system to record the movements of that particular player more closely than other players on a field or court. In one embodiment, the tracking features of the system are enhanced by using exposure compensation and stabilization techniques to maintain a tracking lock on the object of interest. For example, one embodiment uses exposure compensation and stabilization techniques that are based on comparing historical image data with more current image data to retain a tracking lock on the designated object. The capability of the digital camera to track the object of interest is thus enhanced. The exposure compensation can mitigate the deleterious effect of changing lighting conditions on the tracking system, which can contribute to tracking systems losing an object being tracked.

In one embodiment, the digital imaging device includes an image stabilization module configured to mitigate the effect of jitter, shaking, lag and other unfavorable factors on its tracking system. This allows the device to identify actual object movement more accurately while using confidence levels applied to a weighted filter. These systems and associated methods were found to produce a smoother, more reliable tracking system for the digital imaging device.

In operation, embodiments of a digital imaging system have an image capture system that includes an image sensor and a lens to form a digital camera. In one embodiment, the field of view of the camera is sampled for the average intensity of light in a region of interest over time. In addition, the system can determine the size, position and orientation of an object being tracked. The average intensity of light data that is captured can then be used to compensate for exposure changes in the tracked object of interest, while the movement information captured by the imaging sensor over time can be used to stabilize the image to allow more accurate tracking of the object of interest.

In one embodiment, the digital imaging system is configured to determine whether captured frames should first be conditioned in some manner before being sent to an integrated tracking system. In making this determination, light data from a current image frame is compared to historical light data from earlier image frames. The light data may be an average pixel value over a region of interest in the field of view of the captured image frame. If a dramatic change in lighting conditions beyond a specified threshold is detected, then the historical light data can be defined as a "reference value" to be used while the lighting condition is changing. During the period of dramatic lighting change, each newly captured image frame is compensated based on the reference value of the earlier image frame. In one embodiment, the captured frame is compensated using the reference value by taking the difference between the reference value and the lighting condition of that frame, and subtracting that difference from the entire image. This updated image is then transmitted to the tracking system for processing. This compensation continues as long as dramatic changes in lighting conditions continue over time. When the lighting conditions are not dramatically changed, an unchanged or slightly changed image frame may be passed onto the tracking system, and the reference value periodically updates during this time in preparation for the next dramatic lighting condition.

In another embodiment, historical movement data for objects in a region of interest are compared to more current movement data to determine whether the object being tracked has actually moved or whether there is camera shaking or jitter. By comparing the two sets of movement data, a magnitude and direction of the object's movement is calculated. To determine whether a calculated magnitude and direction is actual movement or just jitter, a confidence level is applied whereby only those movements above a certain confidence threshold cause the system to track in that direction. Further, a filter weighting or gain is also applied which, in conjunction with the historical movement data, enhances the ability to discern true movement of an object and reduces the lagging effect of typical tracking algorithms.

The system in some embodiments will first apply the exposure compensation and then the stabilization. Therefore, the light data will first be assessed so as to transmit a properly lighted image frame to the tracking system. Then, the movement data will be analyzed in the properly lighted image frame to discern whether the movement is jitter or is actual movement of the tracked object.

Turning now to FIG. 1, a conventional auto exposure process 50 and the resulting image frames produced thereby are shown. The process may begin with normal light condition 100. Under this lighting condition, the image input to the device for use with a tracking system may appear as it does in image 110. Next, a light condition change 120 may occur whereby the lighting is brighter. As a result, the item being recorded is subject to a bright light condition 101. This results in the image being overexposed with degraded image quality as shown in saturated image 111.

The bright light condition 101 is still present at a later time as continuing bright light condition 102. The device, for instance a camera, may use its auto exposure to adjust to the bright light condition. The auto exposure then slowly takes effect after ten or more frames and the image used for tracking is still of degraded quality, as depicted in image 112. At a later point in time, bright light condition 102 is now bright light condition 103 and the auto exposure is working after about fifteen frames, and the image used for tracking is of better quality as depicted in image 113.

Next, a light condition change at time point 121 may occur whereby the lighting becomes darker than at bright light condition 103. The change may be back to the previous normal lighting condition 100 as is shown by the change back to normal light condition from the bright light condition 104. At this point, the image may be underexposed and the image used for tracking is thus of degraded quality and may be as depicted in darkened image 114. At a later point in time, under normal light condition 105, the auto exposure may be working after about fifteen frames and the image used in the tracking system may be of better quality as shown in image 115. As shown, this conventional process for capturing images over time as a dramatic change in lighting occurs reacts fairly slowly to the changing illumination conditions.

Figure 2:
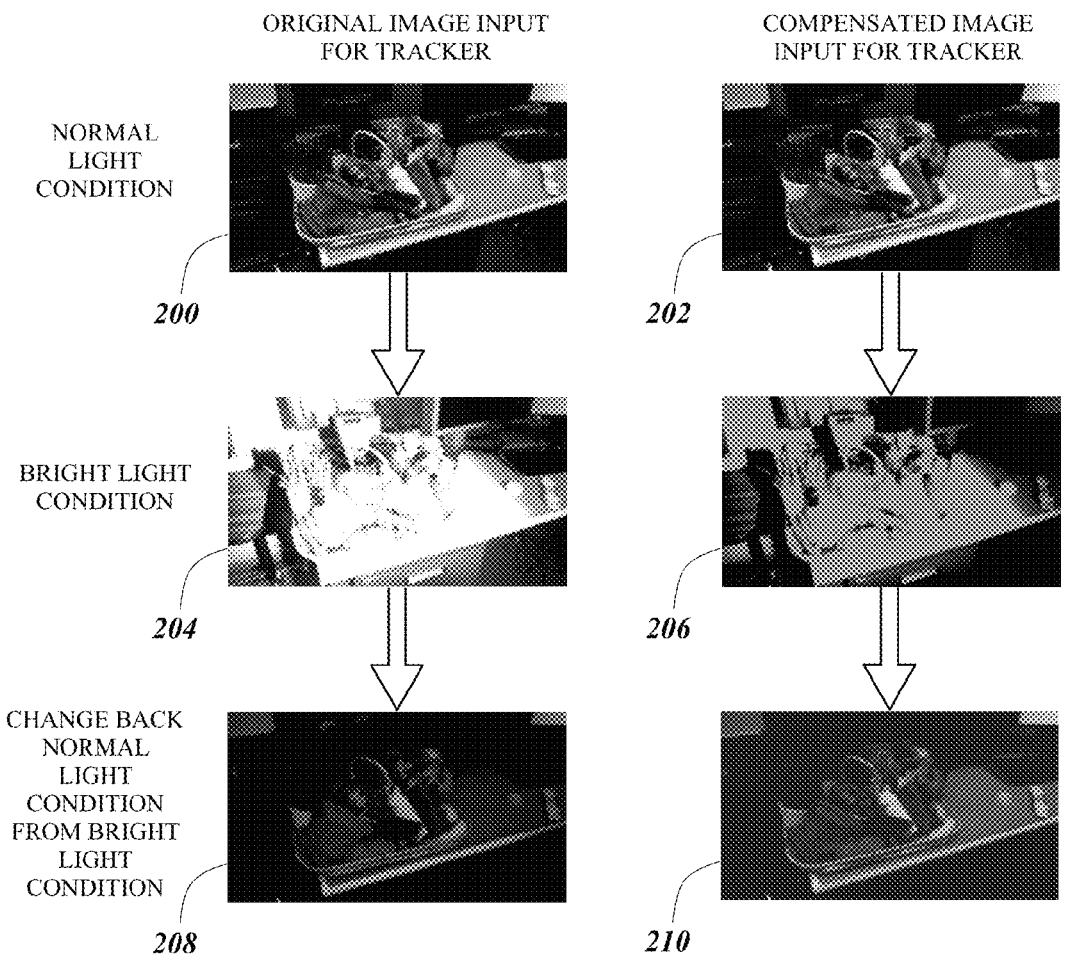
FIG. 2 depicts an embodiment of a compensated exposure process and the resulting image frames produced thereby.

In contrast to the process of FIG. 1, FIG. 2 depicts an embodiment of a compensated exposure process and the resulting image frames produced thereby. Compensated images are shown as they may appear in some embodiments relative to an original image. In some embodiments, the image is input to a tracking system. The column on the left of FIG. 2 shows embodiments of images as they appear without exposure compensation, while the column on the right shows compensated images that may be input to a tracking system.

The compensated images on the right column of FIG. 2 may be produced using the devices and methods disclosed herein. For example, an original image input for a tracker under normal light conditions may appear as image 200. Using an exposure compensation method or device, a corresponding compensated image under normal light conditions may appear as image 202. As the lighting condition is normal for original image 200, the compensated image 202 may appear the same or similar to original image 200.

However, under a bright light condition, an original image may appear as depicted in image 204. With auto exposure, the bright light condition in image 204 may not be adjusted enough to reliably track an item under such conditions. A compensated image may improve the tracker capability. The compensated image 206 may be input to the tracking system and produce more reliable tracking. As the light changes back to normal conditions, an original image may appear as depicted in image 208. This original image 208 is less than optimal for a tracking system. Therefore, the compensated image 210 may be used as a better input image for the tracking system.

The images shown in FIG. 2 are embodiments of how some image frames may appear. Other image frames may appear differently. The images shown are for the sake of illustration only. Other images with brighter or darker appearances, or with other varied attributes, may be used in the methods and systems disclosed herein and are within the scope of the present disclosure.

Figure 3A:
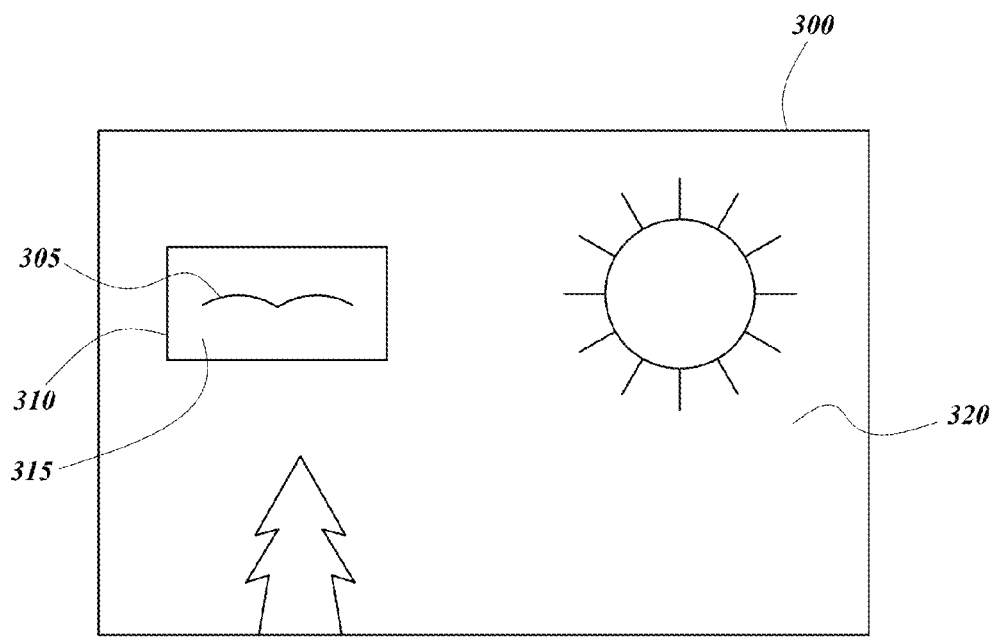
FIGS. 3A-3B depict embodiments of image frames produced by a recording device with a tracking system having exposure compensation and stabilization.
Figure 3B:
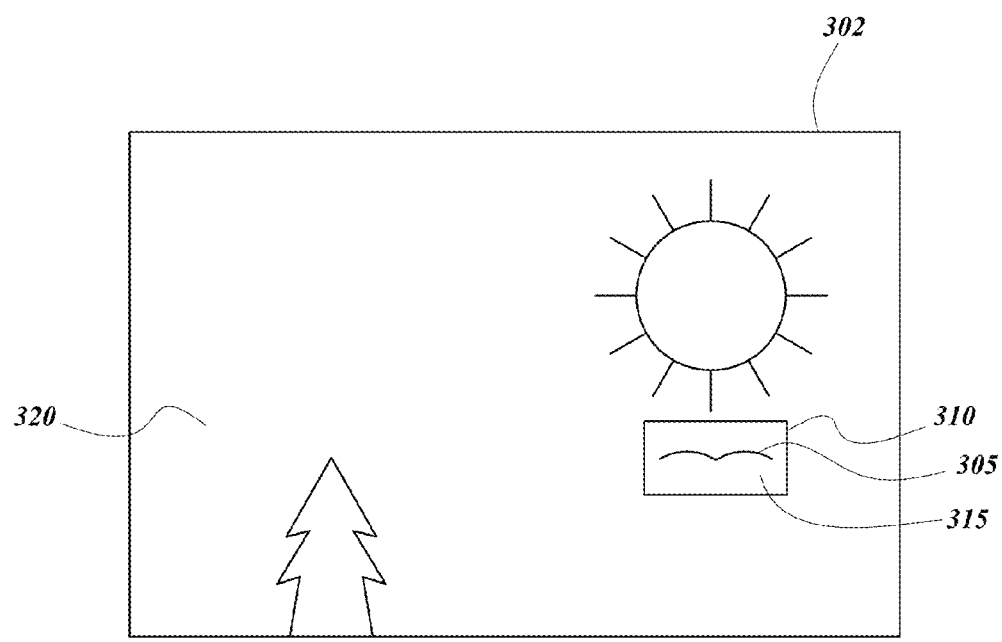

FIGS. 3A-3B depict embodiments of image frames 300, 302 produced by a recording device with a tracking system having exposure compensation and stabilization. The frame 300 in FIG. 3A depicts a tracked object 305, such as a flying bird, in lighting conditions 320. The lighting condition 320 may be lighter or darker compared to the frame 302 as shown in FIG. 3B, which is also tracking the object 305 in lighting conditions 320. The frames 300, 302 depict the tracked object 305 inside a region of interest 310 having a lighting intensity 315. The intensity inside the region 310 in FIG. 3B is lighter than the region 310 in FIG. 3A as the object being tracked in frame 302 is now nearer to a bright light source, the sun. Outside the region 310, the frames 300 have lighting intensity 320, which may be the same or different from the intensity 315 inside the region 310.

FIG. 3A depicts the tracked object 305 in a first position at a moment in time, while FIG. 3B depicts the same tracked object 305 in a different position and/or orientation at a later moment in time. "Position" and/or "orientation" as used herein may refer to mere movement or translation of the object 305, either in the plane of the frame 300 and/or into and/or out of the plane of the frame 300. Position and orientation may also refer to rotations or other movements of the object 305. Any conceivable movement of the object 305, including vibratory movement and/or smooth movement, is within the scope of the present disclosure and may be denoted by such terms as position, orientation, location, coordinates, and the like. Further, such movements refer to relative movement between the object 305 and the device creating the frame 300. For instance, in some embodiments, the device may be stationary while the object 305 is moving. In some embodiments, the device may be moving while the object 305 is stationary. In some embodiments, both the device and the object 305 may be moving. Further, such movement may be due to zoom features of the recording device. For example, an object 305 may appear to move farther away or closer in frame 300 due to zooming out or in, respectively, on the object 305. Any combination of movements, or features of the recording device, that produces the frames 300, 302 and that results in apparent relative motion of the object 305 with respect to the recording device, is contemplated.

In FIG. 3A, the region of interest 310 has been defined that captures the tracked object 305. As discussed in further detail herein, for example with respect to FIGS. 6 and 10A-10H, the region of interest 310 may be defined automatically or manually by selecting the object 305 to track. As shown in FIG. 3A, the region 310 surrounds the object 305 with a rectangular shaped-box having a width and a height. In a preferred embodiment, the region 310 captures the object 305 in a manner that allows for maintaining the object 305 inside the region 310 as the object 305 moves. For instance, the region 310 may be sized such that it captures the object 305 and also provides an extra margin around the object 305 to ensure full capture of the object 305 in the region 310. Therefore, in some embodiments, the region 310 may fully encompass the object 305, as shown. Further, in some embodiments, the region 310 may partially capture the object 305, for example while the object 305 is moving and the region 310 is responding to the movement of the object 305.

In still other embodiments, the region 310 may capture a larger area of the frame 300 than is shown. For example, the region 310 may be larger due to a larger specified margin in order to ensure that the object 305 is captured. "Margin" here refers to its usual and ordinary sense, including an extra enlargement of the region beyond what is necessary to capture only the object 305. For instance, the region 310 may be rectangular and sized based on the width of the object 305 as shown. The region 310 may also be sized based on the height of the object 305. Other embodiments and configurations of the region 310 that capture the object 305, although not explicitly addressed or shown herein, are within the scope of the present disclosure. For instance, a region 310 that is more or less than four-sided, such as a circle, triangle, or other polygon, is contemplated. Further, the region 310 may conform to the shape of the object 305 being tracked, for instance by having a shape or contour that is the same as or similar to the object 305.

Referring to FIG. 3B, the frame 302 shows the object 305 being tracked by the region of interest 310 as the object 305 is near the sun, a bright light source. As shown, the object 305 is now closer to the sun and is therefore in a brighter area. Therefore, the intensity inside region 310 is brighter in frame 302 as compared to frame 300. Other changes in lighting intensity in the frames 300, 302 are possible. For instance, the lighting condition 320 may be brighter in frame 302 compared to frame 300. A relatively brighter lighting condition 320 of FIG. 3B may be due to a number of factors, including for example changes in the ambient lighting. Changes in the lighting 320 may be due to, for example, moving the recording device from a lighter to a darker location, changes in the environment such as introducing cloud cover or a setting sun, removing brighter light sources such as the sun or other light sources, shading the recording device, moving the recording device or object 305 from inside a dark building to outside in the daylight, etc.

While the intensity inside region 310 and/or lighting condition 320 as discussed here may move from darker to lighter conditions over time, other variations in lighting changes are contemplated. In some embodiments, the intensity inside region 310 and/or lighting condition 320 may change from lighter to darker. In some embodiments, the intensity inside region 310 and/or lighting condition 320 may change from darker to lighter to darker, or from lighter to darker to lighter, etc. Other variations in the changing intensity inside region 310 and/or lighting condition 320, even though not explicitly addressed or shown, are contemplated and are within the scope of the present disclosure.

The region of interest 310 as shown in FIG. 3B fully captures the object 305. The object 305 has moved from left to right from frame 300 to frame 302 as shown. This movement may be due to movement of the object 305, and/or of the recording device, and/or zoom features of the device, or any combination thereof. Further, the object 305 and region 310 as shown in frame 302 of FIG. 3B are smaller with respect to the object 305 and region 310 as shown in frame 300 of FIG. 3A. As mentioned, this may be due to the object 305 moving farther from the recording device, and/or the recording device moving farther from the object 305, and/or the recording device zooming out from the object 305, and/or other movements discussed herein, or any combination thereof.

In some embodiments, the region of interest 310 may automatically change size and/or shape as it tracks the object 305. For instance, the region 310 as shown in FIG. 3B is rectangular with reduced width and height dimensions relative to FIG. 3A. The region 310 of FIG. 3B has relatively smaller width and height, and other changes to the size are possible as well, for instance larger width and height. In some embodiments, as the region 310 tracks the object 305, the region 310 may vary in shape as well. For instance, the region may morph or otherwise alter its shape to accord with the object 305 being tracked as the object 305 changes shape as viewed in the frame 300. This may be due to the object 305 actually changing shape in reality or it may be merely viewed as such by the frames 300, 302, for example if the object 305 rotates relative to the recording device. Other shapes of the region 310 are possible as well, for instance those discussed above.

Further, the change in location or size of the region 310 from one frame 300 to another frame 302 may be of varying amounts. For example, the region 310 may change slightly from one frame to another, or the region 310 may change dramatically, or any amount in between, or not at all. Thus the changes to the region 310 may be in varying amounts.

Determination of the amount of change in the size, location, etc. of the region 310 may be done by calculating a variation indicator based on these changes, as is discussed in further detail herein, for example with respect to FIGS. 6 and 10A-10H.

The changes of region 310 in location, size, shape, and/or in any other attributes, as the region 310 tracks the object 305, may be recorded and/or used as historical region data or parameters. As is discussed in further detail herein, for example with respect to FIGS. 7 and 10A-10H, such data may be used in some embodiments of the tracking method disclosed in order to stabilize the tracking system.

Further, any references to changes in any single attribute of the region 310, for instance location, include in its meaning changes to any other attributes of the region 310, such as size or shape. Therefore, for instance, while a change in "location" of the region 310 may be referenced in the present disclosure, it is understood that this language encompasses changes in size, shape, orientation and/or any other attribute of the region 310 as well.

While the object 305 may stay within the frames 300, 302 from FIG. 3A to 3B, in some embodiments it may also leave after frame 300 and return in frame 302. In some embodiments, the frames 300 and 302 may not be consecutive but may be separated by a large amount of time. In some embodiments, the tracking system and methods disclosed herein may recognize the object 305 when it returns to the field of view of the recording device. Thus, the object 305 may be tracked in frame 300 when it is visible, then not tracked in between frames 300 and 302 while it is not visible, and then tracked again in frame 302 when it is visible again. The object 305 may not be visible because it left the field of view of the recording device, or for any other reasons, for instance it may be obscured by another object in the image frame.

As shown in FIGS. 3A and 3B, the lighting intensities inside the region 310 are referred to as lighting intensity 315. In some embodiments, this intensity 315 is the average lighting intensity captured in the region 310. For instance, the intensity of all or most pixels in the region 310 may be determined and then averaged. In some embodiments, the lighting intensity 315 may be an average from a sampling of fewer than most of the pixels inside the region 310. In some embodiments, the lighting intensity 315 may be a mere sampling without any averaging or other calculation performed. In other embodiments, the lighting intensity 315 may be some other calculation other than averaging performed on all, most, or some of the pixels in the region 310 that is indicative of the lighting intensity in the region 310. Other sample sizes of the pixels captured in the region 310 and other calculations may be performed and can be represented as the lighting intensity 315. These are just some of the operations and sample sizes, but others are within the scope of the present disclosure as well. Further details of some embodiments of such calculations are described herein, for example with respect to FIGS. 6-8.

As shown in FIGS. 3A-3B, the tracked object 305 has moved from a relatively darker location in frame 300 in FIG. 3A to a relatively lighter location of frame 302 in FIG. 3B. The lighting intensity 315 inside the region 310 in FIG. 3A is thus darker as compared to the lighting intensity 315 inside the region 310 in FIG. 3B. As shown, this is due to the changes in the ambient lighting condition 320 as the object in FIG. 3B is now closer to the line of sight of the sun. However, as discussed above, the changes of lighting intensity 315 inside the region 310 may be due to a variety of other factors, such as moving the recording device from a darker indoors to a lighter outdoors, etc.

Further, this change in the lighting intensity 315 from one frame 300 to another may be of varying amounts. For example, the lighting intensity 315 may change slightly from one frame to another, or the lighting intensity 315 may change dramatically. This latter situation, i.e. changes to the lighting intensity 315 that are dramatic, may be referred to herein in multiple manners, all of which denote the same idea. For instance, such "dramatic" changes in lighting intensity 315 may be referred to as major, great, large, severe, intense, big, abnormal, etc. Similarly, changes that are not dramatic may be referred to herein in various manners, for example as minor, small, undramatic, slight, little, normal etc. Determination of whether a change in lighting intensity 315 is large or small may be done by comparing the change in lighting intensity 315 to an intensity limit, as discussed in further detail herein, for example with respect to FIGS. 6-8.

The tracking system, devices and methods disclosed herein address the aforementioned changes to the lighting condition 320 and/or lighting intensity 315, whether dramatic or otherwise, and the aforementioned changes to the region of interest 310. Such changes in lighting intensity are addressed in part by exposure compensation of the lighting intensity levels of a current image frame. FIG. 4A is a chart showing embodiments of changing lighting intensity levels along with corresponding compensated intensity levels. FIG. 4B is a chart showing embodiments of how a reference value, which may be used in the compensation devices and methods, changes with respect to the changing lighting intensity levels shown in FIG. 4A. Details of how the compensated intensity is achieved by using the reference value are discussed in further detail herein, for example with respect to FIGS. 6-8, while FIGS. 4A-4B show how these values may be changing in response to changed lighting conditions. The values shown are exemplary of an embodiment of the present disclosure and are not meant to provide quantitative requirements. Instead, the values shown in FIGS. 4A-4B are used to describe representative qualitative relationships between them, as will now be discussed.

FIGS. 4A-4B therefore depict how the compensated intensity level and a reference value may change under changing original lighting conditions. In particular, FIG. 4A depicts how the original intensity level (for instance, lighting intensity 315 from FIGS. 3A-3B) and a compensated intensity level may change. The vertical axis in FIG. 4A may be intensity value and the horizontal axis may be time or frames measured over time. FIG. 4B depicts how the reference value may change. The vertical axis in FIG. 4B may be intensity for the reference value and the horizontal axis may be time or frames measured over time.

Further, the horizontal axes of FIGS. 4A and 4B may be aligned, such that a given frame or point in time from FIG. 4A corresponds to the same frame or point in time in FIG. 4B. For instance, the horizontal axis of FIG. 4A contains labels beginning at a value of "0" and ending at "250." Likewise, the horizontal axis of FIG. 4B contains labels beginning at a value of "0" and ending at "250." These labels on the horizontal axes of FIGS. 4A and 4B represent the same frames or points in time.

In FIG. 4A, the original intensity level is shown by a dashed line, for example at 406. The compensated intensity level is shown by the solid line, for example at 405. FIG. 4B depicts how the reference value may correspondingly change and is shown, for example, by the line 400. For example, the reference value may initially be equal to the original intensity level. Then, as shown in FIGS. 4A-4B, under normal lighting conditions where the intensity is not dramatically changing, and as discussed in further detail herein with respect to FIG. 8, the reference value may update periodically to match the original intensity level as it changes. Such a period of periodic updating is shown over the period 426 identified in FIG. 4B, which corresponds to the first "normal light" condition denoted in FIG. 4A. During this time, as seen in FIG. 4A, the original intensity level is not dramatically changing. Therefore, the compensated intensity level has a similar value as the original intensity level, as shown by, for example, the location 402 in FIG. 4A. The reference value is periodically updating, but only in preparation for a dramatic change in lighting. Because the light in period 426 is not dramatically changing, the reference value is not being used to compensate the intensity and thus the compensated intensity level is similar to the original intensity level. Thus, the compensated intensity level over time stays relatively flat and consistent with the original intensity level.

After the period 426 of normal light, the lighting condition may then change dramatically. Under a first bright light condition, for example on FIG. 4A at location 404, the change shown is dramatic. From 404, the original light intensity may jump dramatically as shown by location 406. FIG. 4B depicts this period of dramatic changes in light at period 428. The reference value may then stop updating periodically, as shown by the flat line 400 over the location denoted by period 428. Once the reference value 400 stops updating periodically, then the compensated intensity level is as shown in FIG. 4A at 405, because the image is compensated using the reference value. The original intensity level is being affected by the auto exposure as shown at 408, but it is not adequately responsive for the tracking system.

The lighting condition may then change back to a normal lighting condition and the original intensity level may drop to the value shown at 410. This may cause a slight change in the compensated level as shown at 410. This is due to the particular timing and threshold levels used in the exposure compensation system. The slight change may be negative, as shown, or positive. The original intensity level is now at 412 while the compensated intensity level is at 411 due to the reference value, as depicted in FIG. 4B, remaining constant.

Another bright light condition may follow, for example on FIG. 4A at position 414, and the change again may be dramatic. From 414, the original light intensity may jump dramatically as shown, for example, by location 416. FIG. 4B depicts this period of dramatic changes in light at period 428. The reference value may still not be updating periodically, as shown by line 400 over period 428. Once the reference value 400 stops updating periodically, then the compensated intensity level is as shown in FIG. 4A at 415, because the image is compensated using the reference value. The original intensity level is being affected by the auto exposure as shown at 418, but it is not adequate for the tracking system.

The lighting condition may then change back to a normal lighting condition and the original intensity level may drop to the value shown at 420. This may cause a slight change in the compensated level as shown at 420. This is due to the particular timing and threshold levels used in the exposure compensation system. The slight change may be positive, as shown, or negative. The original intensity level is now at 422 while the compensated intensity level is at 421 due to the reference value, as depicted in FIG. 4B, remaining constant.

Another normal light condition may follow, and the original intensity level may increase to the level shown in FIG. 4A at 424. At 424, there is no more dramatic change in lighting condition, and thus the reference value may begin to periodically update again as shown in FIG. 4B at 430. The compensated intensity level may be as shown at 424 in FIG. 4A.

The relationships discussed above between the original intensity level, the compensated intensity level, and the reference value due to changing lighting conditions are merely exemplary. Other variations in these values are possible and are within the scope of the present disclosure. For instance, while dramatic lighting conditions involving brighter lighting have been discussed, it is understood that dramatic lighting conditions involving darker lighting are also contemplated. The use of dramatically brighter lighting with respect to FIG. 4 is for illustration only and does not limit the scope of the present disclosure. These various changes in lighting may be compensated by, and these various relationships between the lighting and the reference value may be employed in, a variety of devices and tracking systems. One such device will now be described.

Figure 5:
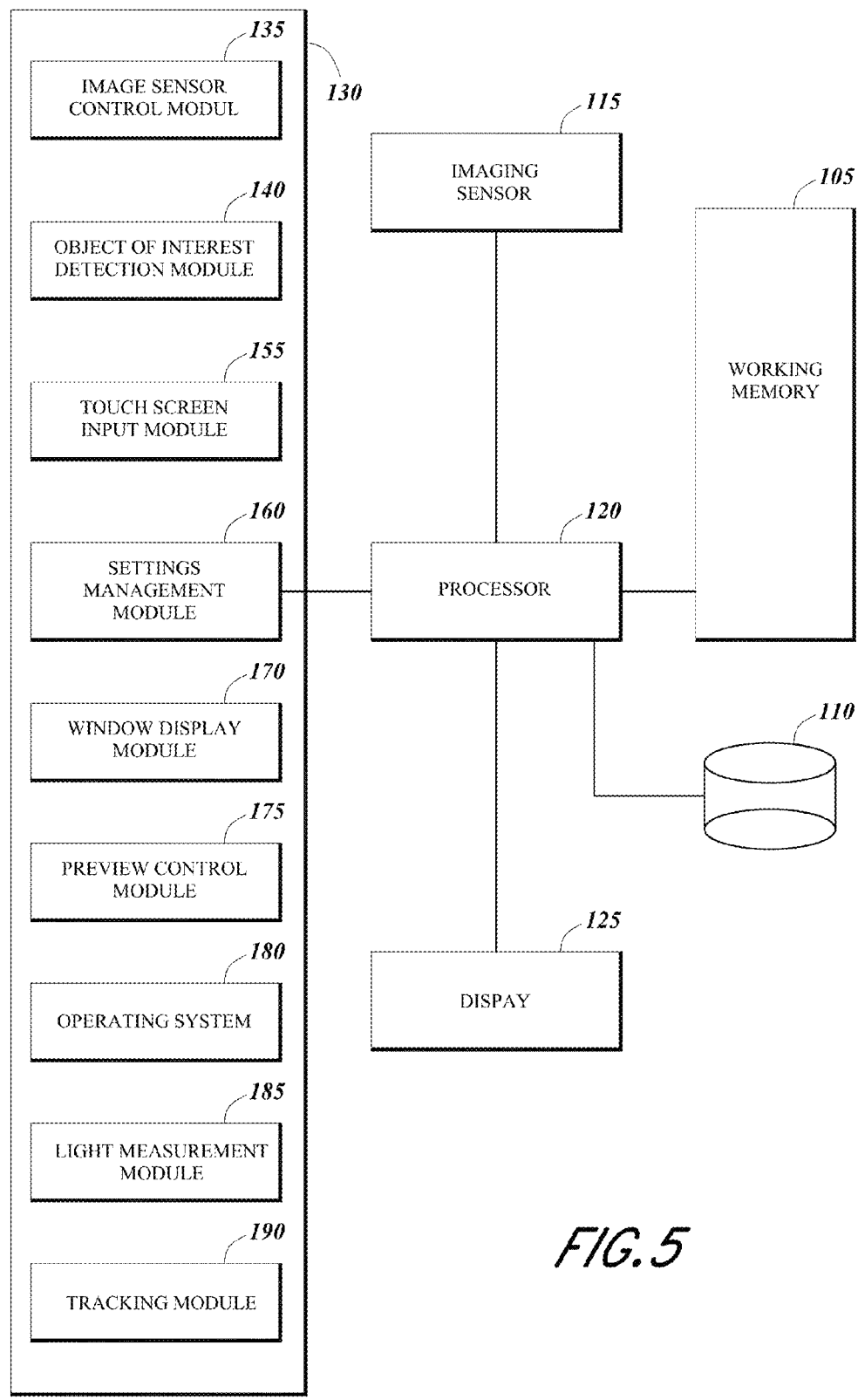
FIG. 5 depicts a block diagram of a recording device comprising a tracking system having modules for managing exposure compensation and stabilization.

FIG. 5 depicts a block diagram of a digital imaging device 500 comprising a tracking system with exposure compensation and stabilization. The device 500 has a set of components including a processor 520 linked to an imaging sensor 515. A working memory 505, storage 510, electronic display 525, and memory 530 are also in communication with the processor 520.

Device 500 may be a cell phone, digital camera, personal digital assistant, tablet, or similar apparatus having at least one imaging sensor. The device 500 may also be a more stationary device such as a desktop personal computer, video conferencing station, or the like. A plurality of applications may be available to the user on device 500. These applications may include traditional photographic applications, high dynamic range imaging, panoramic video, or stereoscopic imaging such as 3D images or 3D video.

Processor 520 may be a general purpose processing unit or a processor specially designed for imaging applications. As shown, the processor 520 is connected to a memory 530 and a working memory 505. In the illustrated embodiment, the memory 530 stores an imaging sensor control module 535, object of interest detection module 540, touch screen input module 555, settings management module 560, window display module 570, preview control module 575, operating system 580, light measurement module 585 and tracking module 590. These modules include instructions that configure the processor to perform various image processing and device management tasks. Working memory 505 may be used by processor 520 to store a working set of processor instructions contained in the modules of memory 530. Alternatively, working memory 505 may also be used by processor 520 to store dynamic data created during the operation of device 500.

As mentioned above, the processor is configured by several modules stored in the memories. The imaging sensor control module 535 includes instructions that configure the processor 520 to adjust the focus position of imaging sensor 515. The imaging sensor control module 535 also includes instructions that configure the processor 520 to capture images with imaging sensor 515. Therefore, processor 520, along with image capture control module 535, imaging sensor 515, and working memory 505 represent one means for capturing an image using an imaging sensor. The object of interest detection module 540 provides instructions that configure the processor 520 to detect an object of interest in the images captured by imaging sensor 515. In some embodiments, an object of interest may be a tracked object. Touch screen input module 555 may include instructions that configure the processor 520 to receive touch inputs from a touch screen display, for example, display 525. Settings management module 560 may include instructions to manage various parameter settings for device 500. For example, parameters related to the configuration of the preview window may be managed by module 560. Window display module 570 may include instructions to manage the layout of data within the preview window generated on display 525 within device 500. For example, the preview window may include more than one image "window" within it. Some "windows" may display data at differing scales. Instructions within window display module 570 may configure the processor to translate data related to each of these sub windows into display commands for display 525.

Preview control module 575 includes instructions that configure the processor to display a preview window on electronic display 525 according to the methods described herein. For example, preview control module 575 may include instructions that call subroutines in imaging control module 535 in order to configure the processor 520 to capture a first image using imaging sensor 515. Preview control module 575 may then call object of interest detection module 540 to detect objects of interest in a first image captured by imaging sensor 515. Instructions in preview control module may then invoke settings management module 560 to determine how the operator has configured the preview window to display on display 525. This information may be provided to window display module 570, in order to layout the preview window as configured using the image data captured by imaging sensor 515 and the object of interest information determined by object of interest detection module 540. Window display module 570 may invoke instructions in operating system 580 to control the display and cause it to display the appropriate preview window configuration on electronic display 525.

Operating system module 580 configures the processor to manage the memory and processing resources of device 500. For example, operating system module 580 may include device drivers to manage hardware resources such as the electronic display 525, storage 510, or imaging sensor 515. Therefore, in some embodiments, instructions contained in the preview image processing modules discussed above may not interact with these hardware resources directly, but instead interact through standard subroutines or APIs located in operating system component 580. Instructions within operating system 580 may then interact directly with these hardware components.

Processor 520 may write data to storage module 510. While storage module 510 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

Although FIG. 5 depicts a device comprising separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 5 illustrates two memory components, to include memory component 530 comprising several modules, and a separate memory 505 comprising a working memory, one with skill in the art would recognize several embodiments utilizing different memory architectures. For example, a design may utilize ROM or static RAM memory for the storage of processor instructions implementing the modules contained in memory 530. Alternatively, processor instructions may be read at system startup from a disk storage device that is integrated into device 500 or connected via an external device port. The processor instructions may then be loaded into RAM to facilitate execution by the processor. For example, working memory 505 may be a RAM memory, with instructions loaded into working memory 505 before execution by the processor 520.

Some devices 500 may have exposure compensation and stabilization capabilities. This allows the device 500 to track an item as it moves relative to the field of view of the device 500 in a stable manner and to compensate for dramatic changes in lighting conditions. In some embodiments, toward these ends the device 500 may include a light measurement module 585 and tracking module 590.

Tracking module 590 includes instructions that configure the processor to track an object in a preview window on the electronic display 525 according to the methods described herein. For example, tracking module 590 may include instructions that call subroutines in imaging control module 535 in order to configure the processor 520 to capture a first image using imaging sensor 515. Tracking module 590 may then call object of interest detection module 540 to detect and then track objects of interest in a first image captured by imaging sensor 515. Instructions in preview control module 575 may then invoke settings management module 560 to determine how the operator has configured the preview window, for example for the region of interest, to display on display 525. This information may be provided to window display module 570, in order to layout the region of interest as configured using the image data captured by imaging sensor 515 and the object of interest information determined by object of interest detection module 540. Window display module 570 may invoke instructions in operating system 580 to control the display and cause it to display the appropriate preview window configuration on electronic display 525.

The device 500 may implement compensation in various ways. For instance, the image 200 or 204 or 208 may be sensed by the imaging sensor 515 and communicated to the processor 520. The imaging sensor control module 535 or the object of interest detection module 540 may analyze the average lighting intensity in a tracked region of interest to calculate a reference value 405, for example. Operations carried out using the reference value, for instance subtracting the reference value from a current bright light condition intensity value, may be carried out by the operating system 580 or the processor 520. The data may be stored in the working memory 505 or storage module 510. The data may also be input to the tracking system in a window display module 570 or preview control module 575. These modules may input the compensated image 202 or 206 or 210 to a tracking system in those or any other modules of device 500.

In some embodiments, light measurement module 585 may be used to compensate for dramatic lighting conditions. Module 585 includes instructions that configure the processor to measure the light intensity on an electronic display 525 and/or in a region of interest according to the methods described herein. For example, light measurement module 585 may include instructions that call subroutines in imaging control module 535 in order to configure the processor 520 to analyze a first image frame, for example by using imaging sensor 515. Light measurement module 585 may then call the object of interest detection module 540 to detect objects of interest in a first image captured by imaging sensor 515, for example a region of interest. Either module 585 or 540 may then analyze the intensity of light in the region of interest, or elsewhere in the image frame, for instance by comparing lighting intensity levels from different image frames. The light measurement module 585 may further be configured to use the results of such analysis to alter the lighting intensity of an entire image frame. For instance, the light measurement module 585 may call the settings management module 560 or preview control module 575 to subtract or add intensity level to an image frame in order to compensate for dramatic changes in lighting conditions. These or other modules may further include instructions that configure the processor to send the image frame to the tracking system. Further, these or similar operations may be carried out on other image frames in order to carry out the compensation methods disclosed herein.

Many other variations of operations and the modules used in carrying out the operations may be implemented. Further, any of the functions in the modules may be carried out by various modules and need not be limited to just one module for one capability. The functionalities recited of the various modules are not the sole modules or components capable of carrying out the aforementioned functions but are merely listed as examples of how the disclosed features may be implemented.

Figure 6:
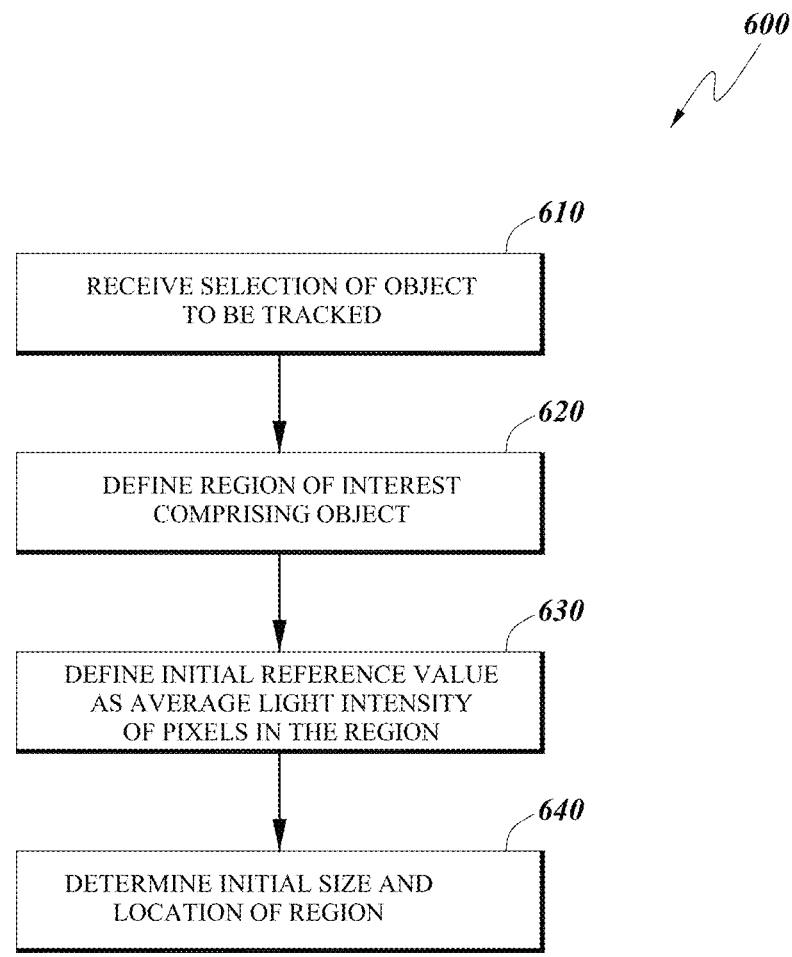
FIG. 6 is a flow chart diagramming one embodiment of a method for initializing a reference value and parameters of a region of interest.
Figure 7:
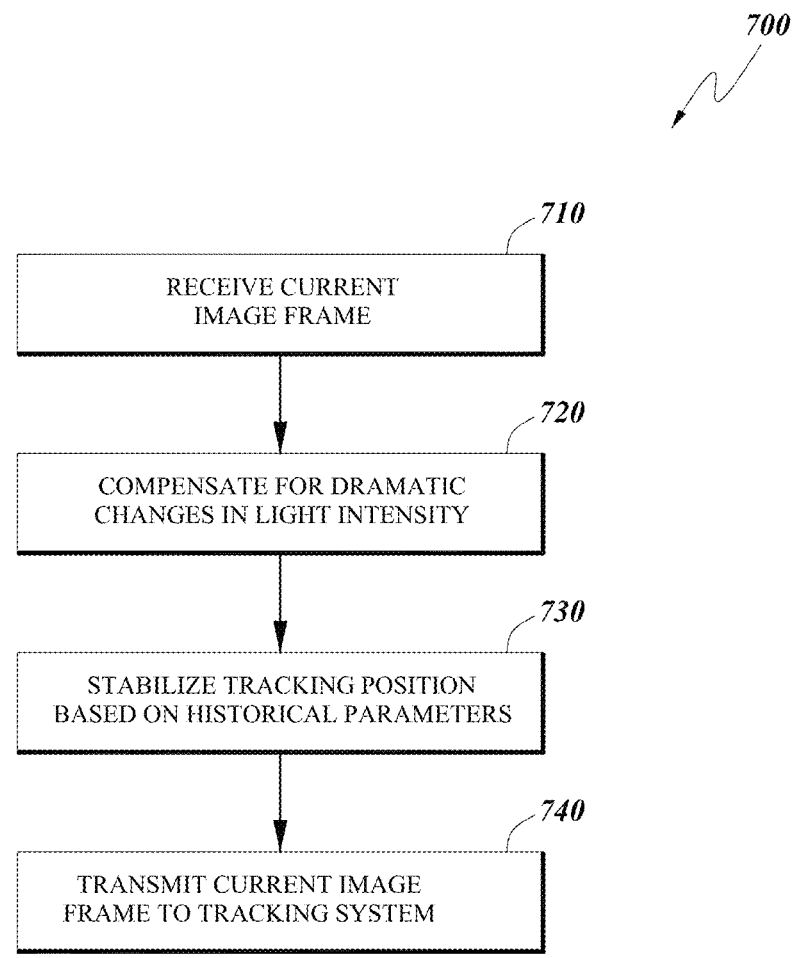
FIG. 7 is a flow chart diagramming one embodiment of an overview of a method for exposure compensation and stabilization.
Figure 8:
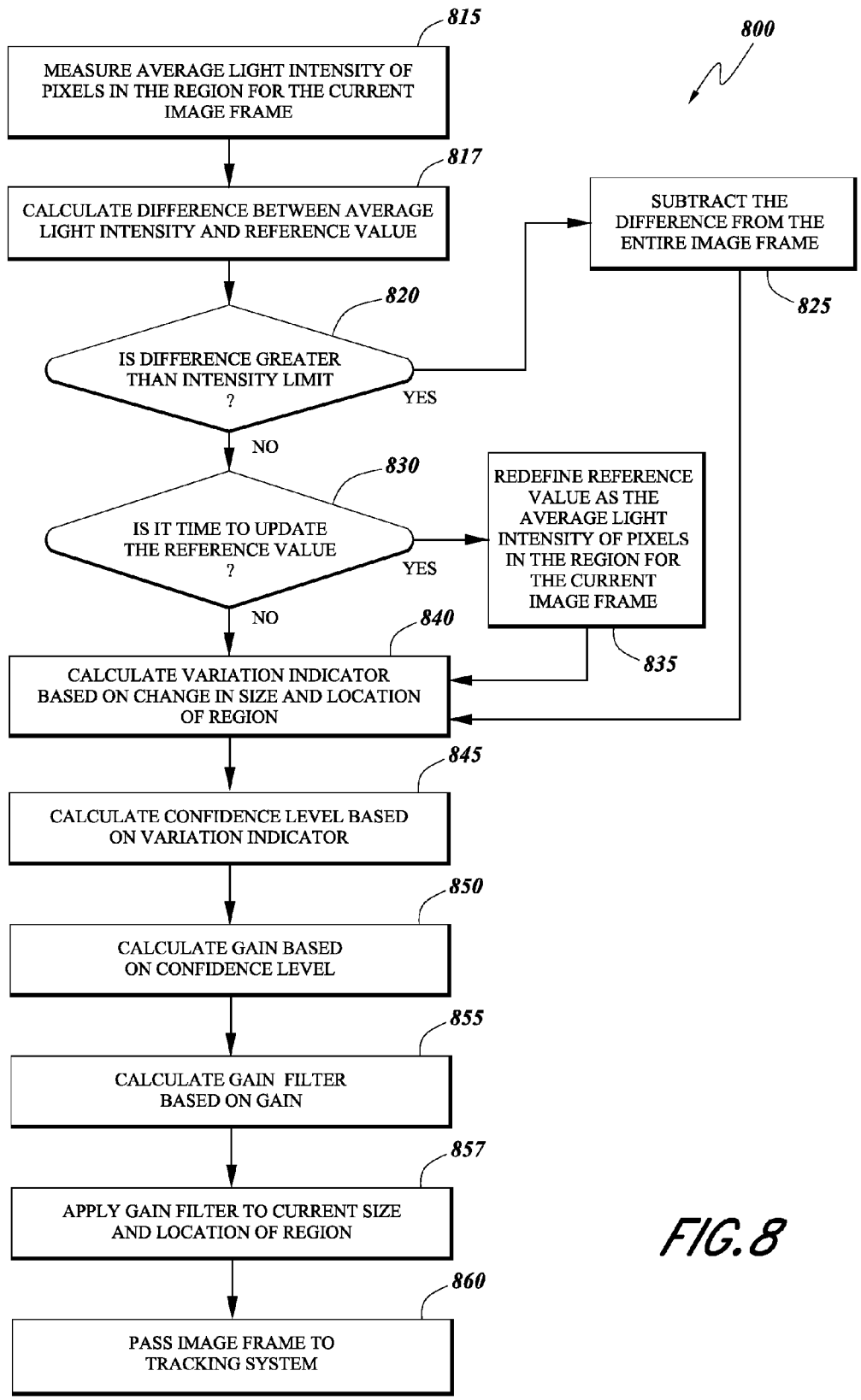
FIG. 8 is a flow chart showing one embodiment of a method for exposure compensation and stabilization using a reference value and variation indicators.

The systems and devices disclosed herein may use a variety of compensation and stabilization methods. FIGS. 6-8 are flow charts of different embodiments of methods for exposure compensation and stabilization for tracking, while FIGS. 9 and 10A-10H show details of computational tools that may be employed in some steps of some embodiments of these methods.

Referring to FIG. 6, an embodiment of a method 600 of initializing certain embodiments of a tracking system is shown. The method 600 may begin with step 610 wherein selection of an object to be tracked is received. In some embodiments, selection is done manually. For example, a user may select an object 305 to track from image frame 300. In an implementation, the frame 300 is displayed on a touch screen and a user touches the area of the screen where object 305 is located. In some embodiments, confirmation of the object 305 to be tracked is given.

A region of interest 310 may then be defined in step 620. The region 310 may circumscribe the object 305 on the display 125. In some embodiments, the definition of the region 310 may be automatic. For instance, the object 305 may be automatically recognized in the first instance, for example by analyzing objects in the field of view, comparing them to pre-specified object descriptions, and recognizing objects that match those descriptions. In some embodiments, the object 305 is automatically recognized after it leaves and then returns to the field of view of the recording device and is shown again in frame 300.

Further, for step 620 the region 310 may be defined with various shapes and/or sizes. In some embodiments, these shapes and/or sizes may be automatically generated based on characteristics of the object 305, such as the shape, size, movement, or other attributes of the object 305. In some embodiments, the shape or size of the region 310 may be specified by a user. For instance, a user may specify a particular shape, such as a rectangle, and a margin, such as an inch, for the region of interest 310. The region 310 would then take on rectangular shapes and leave an inch margin around the object being tracked. Other variations and configurations for the selection of the object 305 to be tracked and for definition of the region of interest 310 in which to track the object, although not explicitly addressed herein, are within the scope of the present disclosure.

The method 600 may next move to step 630 wherein an initial reference value is defined as the average light intensity of pixels in the region of interest 310. The intensity may refer to a value corresponding to the brightness of the pixels. In an implementation, all or most of the pixels contained in the region 310 are measured and an average is computed based on the measurements. In some embodiments, an average light intensity is computed based on fewer than most pixels in the region 310. In some embodiments, other calculations indicative of the brightness or intensity are performed on the pixels measured in the region 310. Further, the light may be analyzed in areas of the image frame besides the region of interest 310. For instance, if the intensity measured inside the region 310 results in an error, then pixels adjacent to or farther from the region 310 may also be measured and used in the computations.

After defining an initial reference value in step 630, the method 600 may move to step 640 wherein the initial size and location of the region of interest 310 are determined. The initial size may include, for example, the height and width of a rectangular region 310. The initial location may include, for example, coordinates of a central point of the region 310. In some embodiments, the location of the region 310 is given in X and Y coordinates, where X represents a horizontal coordinate and Y represents a vertical coordinate, for example, of the frame 300. As mentioned, it is understood that size and location includes other parameters related to the region 310, such as area, contour, shape, etc.

The location of the region 310 may be used as a tracking position for the tracking system. Thus an initial tracking position could be defined as the location or coordinates of the center of the region 310 in an image frame 300. In another frame, for instance frame 302, the tracking position could change to the changed coordinates of the center of region 310 in frame 302. Similar operations may be performed to define an initial size, area, shape, etc.

The initialization performed by method 600 may further be done in other orders and need not be carried out in the order described above. For instance, the initial size and location of the region in step 640 may be performed before the reference value is defined in step 630. Other variations to the order of the steps in method 600 are possible and are within the scope of the present disclosure. Further, the method 600 may occur repeatedly, such that multiple values for size, location, etc. are determined and stored. For example, the method 600 may be repeated seven times such that seven entries for the reference value are stored, with each value corresponding to an image frame in the past. Further, for example, seven entries for the size and location of the region 310 may likewise be stored as historical parameters. These historical parameters may then be used to stabilize the tracking system, as described in further detail with respect to FIGS. 7 and 10A-10H.

After the historical parameters for the reference value and the region of interest 310 have initially been defined, for instance as described above with respect to FIG. 6, other methods relating to compensating and stabilizing a tracking system may be performed. An overview of an embodiment of one such method 700 is shown in FIG. 7.

FIG. 7 depicts an overview of an embodiment of a method 700 for tracking with exposure compensation and stabilization features. The method 700 may begin with step 710 by receiving a current image frame. The current image frame, such as frame 302, may be supplied by a recording device. Next, in step 720, any dramatic changes in lighting in the frame may be compensated. For instance, frame 204 under a bright light condition may be compensated as frame 206. After compensation, the method 700 moves to step 730 wherein a tracking position is stabilized based on the historical parameters. As discussed, the tracking position may be the center of a region 310. Thus, in some embodiments, the center of the region 310 may be stabilized using historical parameters, which may include the location and size of the region 310. After stabilization, the current image frame is transmitted to the tracking system in step 740.

The above description is an overview of an embodiment of a method of exposure compensation and stabilization. Details of the method will now be described with respect to the embodiment of method 800 shown in FIG. 8.

Once the reference value or values, and the historical parameter or parameters of the region 310, have been defined in method 700, the method 800 for continued compensation and stabilization as shown in FIG. 8 may be performed. However, it is understood that the method 800 may incorporate the method 700. Further, sequential discussion of methods 700, 800 is not meant to imply any order in carrying them out.

As shown in FIG. 8, the method 800 may begin with step 815 wherein the light intensity of the pixels in the region for the current image frame are measured. In some embodiments, the light intensity for all or most of the pixels are measured and an average is computed. Next, in step 817, the difference between the reference value and the average intensity (from step 815) is calculated. In some embodiments, this difference is calculated by subtracting the reference value from the average intensity.

In the next step 820, the difference calculated in step 817 is analyzed. In some embodiments of step 820, the relationship of the difference to an intensity limit is determined. A shown, in step 820 it may be determined whether the difference is greater than the intensity limit. The intensity limit may be specified by a user or automatically configured.

If the difference is greater than the intensity limit, then the process moves to step 825 to adjust the image frame. As shown, in some embodiments of step 825, the image frame is adjusted by subtracting the difference from the entire image frame. For example, the brightness value for every pixel in the image frame 302 will have the difference subtracted from it. If this difference was a positive value, meaning the average intensity was greater than the reference value, then each pixel in frame 302 will appear darker after the subtraction. This may be seen in FIG. 2 in original frame 204 and the relatively darker compensated frame 206. Conversely, if the difference was a negative value, meaning the average intensity was less than the reference value, then each pixel in frame 302 will appear lighter after the subtraction. This situation may be seen in FIG. 2 in original frame 208 and the relatively lighter compensated frame 210. After step 825, the process 800 moves to step 840 where a variation indicator is calculated, as discussed below.

If the difference calculated in step 817 is not greater than the intensity limit, then the process moves to step 830. In step 830, it is determined whether it is time to update the reference value. In some embodiments, the reference value is updated periodically. It may be updated every second, every few seconds, every minute, or some portion thereof. The period of update may be specified by a user or it may be automatically configured. If it is time to update the reference value, the method 800 moves to step 835, where the reference value is reset or redefined to the average light intensity of pixels in the region of interest for the current image frame. "Reset" here does not necessarily mean it is set to a previous value or to zero. It merely means that it is redefined or set again to a value based on the intensity of pixels in the region of interest for the current image frame, which may or may not be the same as a previous reference value. If it is not time to update the reference value, the method 800 instead moves to step 840.

In step 840, a variation indicator is calculated based on changes to attributes of the region of interest. In some embodiments, as shown, these attributes are parameters that include the size and/or location of the region. The variation indicator may represent the degree or magnitude as well as the direction of change of the region's parameters. For instance, if the region has increased in size by a large amount, then the variation indicator may be positive and large. In some embodiments, if the region has moved in a particular direction by a particular amount, the indicator may reflect this. For instance, a typical X-Y coordinate system, where values are positive to the right and up and negative to the left and down, may be used. If the movement is to the right and up, then the indicator may be positive. Further, if the movement to the right and up is large, then the indicator may likewise be large. Opposite values may be given for opposite changes. Calculation of the variation indicator using an X-Y coordinate system is described in further detail herein, for example, with respect to FIG. 9.

In some embodiments, the indicator may capture changes in the size of the region. For example, the rectangular region 310 in frame 300 has a first width and height. The region 310 in frame 302 has a second width and height that are larger than the first width and height. This change in size may be characterized by subtracting the dimensions in frame 300 from the dimensions in frame 302.

In some embodiments, the variation indicator may be a vector. The vector may be indicative of magnitude and direction of the changes to the region. In some embodiments, arrays may be used to record the changes to multiple attributes or to details of attributes. For instance, a first column of the array may include data on the horizontal size of a rectangular region, a second column may include data on the vertical size of a region, a third column may include data on the direction of movement of the region, and a fourth column may include data on the magnitude of the movement of the region. All of these values may individually be used in the method 800, or a final variation indicator may be used that is calculated based on some or all of the various values. Other variation indicators may be implemented for the various shapes, sizes, locations, etc. that the region may possess.

In some embodiments, multiple variation indicators may be determined and stored. For instance, the initialization method 600 may have been repeated. Or, method 800 may be repeating and storing the variation indicator each time the method 800 is performed. In some embodiments, a variation indicator is stored for each frame that is analyzed. In some embodiments, only a limited number of past variation indicators are stored, such as five, ten, twenty, one hundred, etc., such that only a certain number of the most recent past indicators, along with the current indicator, are stored.

Once a variation indicator has been calculated, the method 800 moves to step 845 and calculates a confidence level based on the variation indicator. In some embodiments, the confidence level is calculated based on historical values of the indicator. For instance, if the variation indicator is similar to a recent set of indicator values, then a higher confidence level results. This is due to the fact that the method ascribes a higher confidence that the change in the region is due to movement of the object if the changes are similar to those as have been recently measured. Conversely, if the current indicator is not similar to a recent set of indicator values, then a lower confidence level results. A low confidence indicates that the change in the region is likely not due to movement of the object, but rather to other factors such as shaking or jitter of the recording device. Further detail of the calculation of the confidence level based on historical variation indicators is described herein, for example with respect to FIGS. 9 and 10A-10H.

Once a confidence level is calculated, the method 800 moves to step 850 wherein a weighting or gain is calculated based on the confidence level. The gain is then used to calculate the gain filter in step 855. Then, in step 857, the gain filter is applied to the tracking position. In some embodiments, the tracking position is the location and/or size of the region 310. After applying the gain filter, then the method 800 moves to step 860 wherein the image frame 302 is passed to the tracking system. In some embodiments, the method 800 may repeat for the next image frame. Further detail of the calculation of the confidence level, the gain and the gain filter, as well as applying the gain filter to the region 310, are described below and with respect to FIGS. 9 and 10A-10H.

Figure 9:
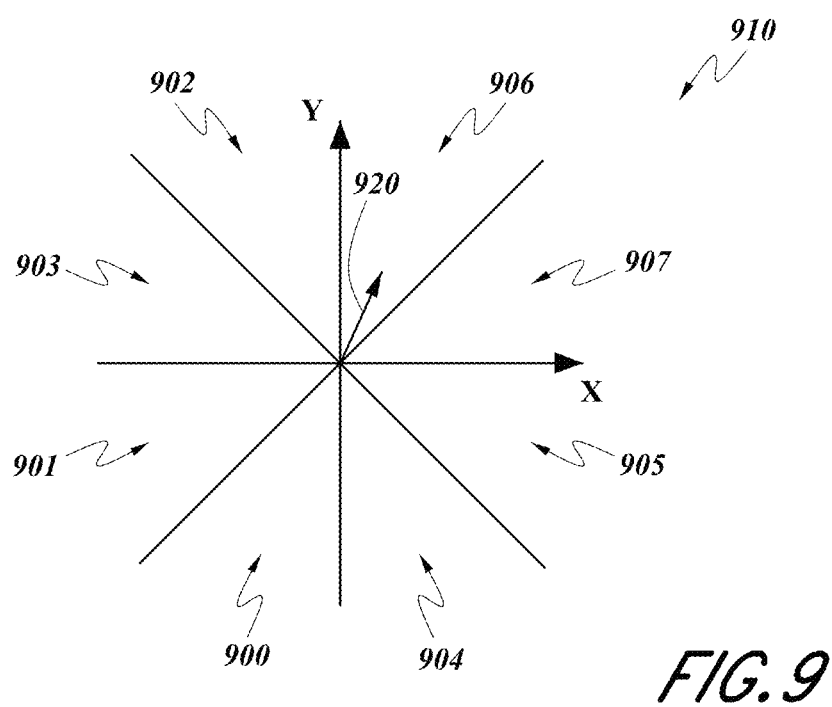
FIG. 9 is a coordinate diagram showing one embodiment of the results of a computational tool for determining a variation indicator and confidence level.

FIG. 9 depicts an embodiment of a computational tool that may be used to calculate the variation indicator and obtain a confidence level. Therefore, the following description may apply to some embodiments of steps 840 and 845 in method 800. As shown, a Cartesian X-Y coordinate system 910 may be used. The system 910 has a horizontal X axis intersecting a vertical Y axis, with the arrows on the axes indicating their respective positive directions. Two diagonal lines also intersect the axes such that eight areas 900-907 are defined. Therefore, for example, some movements with positive X and Y values may be movements in the direction 920 which is into the area 906.

Movements of the region 310 may be calculated using the coordinates from two image frames. As mentioned, the location of a region 310 in an image frame 302 may be represented by coordinates that correspond to the center of the region 310. Movement of the region 310 from one image frame 302 to the next may be calculated by subtracting the previous coordinates from the current coordinates. For instance, the center of the region in the current image frame, represented by $t_0$, may have X-Y coordinates of $(X_0, Y_0) = (3,4)$. Similarly, the center of the region in the previous image frame, represented by $t_{-1}$, may have X-Y coordinates $(X_{-1}, Y_{-1}) = (1,0)$. The movement therefore may be represented as the difference $(X_0, Y_0) - (X_{-1}, Y_{-1}) = (3,4) - (1,0) = (2, 4)$. Therefore, the region moved +2 units in the X direction and +4 units in the Y direction. This direction may be indicated on the coordinate system 900, for example, by arrow 905 extending into area 960.

In some embodiments, the change in the X direction may be compared to the change in the Y direction to determine into which area 900-907 the variation indicator is positioned. In some embodiments, the sign of the X and Y changes along with the ratio of the magnitude of those changes may be used. For example, for a movement of +2 units in the X direction and +4 units in the Y direction, the sign of both movements is positive. Further, the ratio of the magnitudes of these changes may be computed as follows:

$$\frac{|\Delta X|}{|\Delta Y|} = \frac{|2|}{|4|} = \frac{2}{4} = 0.5$$

Therefore, with both X and Y changes positive, and the ratio of the magnitudes less than one, this corresponds to area 906. Similar operations may be done on other movements to determine which area 900-907 to assign to the variation indicator. For instance, if the change in X is positive, the change in Y is negative, and the ratio is greater than one, this would correspond to area 905. For variation indicators that are on a boundary of the areas 900-907, one or the other area on either side of the boundary may be chosen. For instance, if the indicator is on the X axis, either area 905 or 907 may be chosen. This may occur, for example, if either of the changes is zero. In some embodiments, rules are established to handle these and other cases. One such set of rules is shown in Table 1.

TABLE 1

| $\Delta X$ | $\Delta Y$ | $|\Delta X|/|\Delta Y|$ | Area |
|---|---|---|---|
| <0 | <0 | <1 | 900 |
| <0 | <0 | ≥1 | 901 |
| <0 | ≥0 | <1 | 902 |
| <0 | ≥0 | ≥1 | 903 |
| ≥0 | <0 | <1 | 904 |
| ≥0 | <0 | ≥1 | 905 |
| ≥0 | ≥0 | <1 | 906 |
| ≥0 | ≥0 | ≥1 | 907 |

In some embodiments, the historical variation indicators may be used in determining the confidence levels ascribed to a current indicator. In some embodiments, if many of the historical indicators correspond to a certain area 900-907, then a current indicator in that same area 900-907 would result in a higher confidence level. For example, if the past seven frames, which may be represented as $\{t_{-7}, t_{-6}, t_{-5}, t_{-4}, t_{-3}, t_{-2}, t_{-1}\}$, have all had variation indicators in area 906 for those respective frames, which may be represented as {906, 906, 906, 906, 906, 906, 906}, then the current indicator 920, which is also in area 906, would result in the highest confidence level. In some embodiments, the value of the confidence level is determined by calculating how many of the historical variation indicators match the current variation indicator. Continuing the example, because the current indicator in area 906 matches all seven historical indicators, then the confidence level is eight because there are eight indicators—the last seven and the current indicator 920—in the area 906. However, if the current indicator 920 was in the area 900, then it would match zero of the historical indicators, and the confidence level would thus be one because there is only one indicator—the current indicator 920—in the area 900. Therefore, in some embodiments, the confidence level is calculated as the number of instances of the current indicator 920, where the current indicator 920 is included in that number.

In some embodiments, the confidence level may be used to determine the various gain values for the current and previous frames. Therefore, the following description applies to some embodiments of step 850 in method 800. FIGS. 10A-10H depict embodiments of relationships 1001-1008, respectively, that may be used to convert a confidence level into a current gain value. The various relationships 1001-1008 correspond to the confidence levels one through eight, respectively. Thus, for example, if the current confidence level is one then relationship 1001 as shown in FIG. 10A is used, if the confidence level is two then relationship 1002 as shown in FIG. 10B is used, etc. The horizontal axes of the charts 1001-1008 correspond to various gain variables, with "8" corresponding to the current gain variable, "7" as the immediately preceding frame, etc. The values for the gain variables may be represented as $\{a_{-7}, a_{-6}, a_{-5}, a_{-4}, a_{-3}, a_{-2}, a_{-1}, a_0\}$, where the gain variables respectively represent the gain values for the current frame and the previous seven frames. For instance, frame $t_{-7}$ has a gain value represented by $a_{-7}$, frame $t_{-6}$ has a gain value represented by $a_{-6}$, etc. The gain variables are assigned the Y axis values corresponding to the marks 1-8 on the horizontal axes by using the line shown for the appropriate relationship 1001-1008. For instance, if the current confidence level is six, then relationship 1006 as shown in FIG. 10F is used. In relationship 1006, the Y axis values which would be assigned for the gain variables $\{a_{-7}, a_{-6}, a_{-5}, a_{-4}, a_{-3}, a_{-2}, a_{-1}, a_0\}$ would be {0.000, 0.002, 0.009, 0.031, 0.086, 0.182, 0.301, 0.386}, respectively. In some embodiments, all gain variables are reassigned new values when the relationships 1001-1008 are used. Further, the new gain values may or may not be the same as previous values. Other values for the gain will be assigned for other confidence levels.

It is understood that the relationships 1001-1008 shown in FIGS. 10A-10I1 are for illustration only. Other relationships may be used to calculate gain values based on the confidence level.

The gain values may then be used in the gain filter. The gain filter weights the current frame according to the gain values that were previously determined. For example, for the highest confidence of eight, relationship 1008 as shown in FIG. 10I1 is used, whereby all gain variables have a value of zero except for $a_0$ and $a_{-1}$, i.e. the current frame and the immediately preceding frame, with values of approximately 0.982 and 0.018, respectively. This distribution of gain values weights the current frame the most, and the previous frame has a very small weighting, due to the high confidence in the current frame. In some embodiments, the sum of the gain values distributed among the frames is 1.

The weighted distribution of gain values $\{a_{-7}, a_{-6}, a_{-5}, a_{-4}, a_{-3}, a_{-2}, a_{-1}, a_0\}$ in the gain filter may be used to stabilize the size and/or location of the region 310 for the current frame. Therefore, the following description applies to some embodiments of step 857 in method 800. In some embodiments, for the current and previous seven frames, X and Y coordinates may be stored that correspond to the locations of the region 310 in those frames. For example, $(X_{-7}, Y_{-7})$ may correspond to the X and Y coordinates of the center of the region 310 in frame $t_{-7}$, and the gain value for $a_{-7}$ is thus used to weight those coordinates to determine stabilized coordinates $(X_S, Y_S)$. Similar weightings may be done for the other frames and their respective coordinates. For instance, a stabilized $X_S$ coordinate for the location of the region 310 may be determined as follows:

$$X_S = (X_{-7} \times a_{-7}) + (X_{-6} \times a_{-6}) + (X_{-5} \times a_{-5}) + (X_{-4} \times a_{-4}) + (X_{-3} \times a_{-3}) + (X_{-2} \times a_{-2}) + (X_{-1} \times a_{-1}) + (X_0 \times a_0)$$

Similar calculations may be done for the $Y_S$ coordinate. In this manner, the current coordinates $(X_0, Y_0)$ for the region 310 may be adjusted to stabilized coordinates $(X_S, Y_S)$. The region 310 is thus located at $(X_S, Y_S)$ in the tracking system.

In some embodiments, the historical size of the region 310 is used to stabilize the tracking system. Similar operations as described above with respect to the location of the region 310 may be performed on the size of the region 310. For example, a change in the size of the region in the current frame $t_0$ as compared to the previous frame $t_{-1}$ may be calculated by using the various dimensions of the region 310. For instance, the region in the current image frame may have a width of three and a height of four and be expressed as the data set $(X_0,Y_0)=(3,4)$. Similarly, the size of the region in the previous image frame, may have a width of two and a height of five and be expressed as $(X_{-1},Y_{-1})=(2,5)$. The change in size therefore may be represented as the difference $(X_0,Y_0)-(X_{-1},Y_{-1})=(3,4)-(2,5)=(1, -1)$. Therefore, the region increased in width by 1 unit and decreased in height by 1 unit. Similar calculations may be done for a number of previous frames such that a number of variation indicators are defined. The current and historical variation indicators may then be used to determine a confidence level, a gain, and a gain filter as described above.

The logical blocks, modules and flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

Those of skill in the art will recognize that the various illustrative logical blocks, modules, and method steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods, devices and systems of the present invention. This invention is susceptible to modifications in the methods, devices and systems. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the following claims.

What is claimed is:

1. A method of tracking an object with an electronic device, the method comprising:
    defining a reference value based on a first average light intensity of pixels in a first region of a first image frame comprising the object;
    determining a second average light intensity of pixels in a second region of a second image frame comprising the object, the second average light intensity of pixels being different than the first average light intensity of pixels, and the second image frame captured after the first image frame;
    calculating a difference between the reference value of the first region in the first image frame and the determined second average light intensity of the second region in the second image frame;
    redefining the reference value to produce a redefined reference value, based on the average light intensity of pixels in the second region of the second image frame, in response to the calculated difference being less than an intensity limit;
    applying a gain filter to the region of the second image frame to produce a filtered image frame;
    tracking the object using the pixels in the filtered image frame; and
    using the redefined reference value for tracking the object in a third image frame, wherein the third image frame is captured after the second image frame.

2. The method of claim 1, wherein the applying the gain filter comprises calculating a variation indicator of the region based on current and historical parameters of the region.

3. The method of claim 2, wherein the applying the gain filter further comprises determining a confidence level based on the variation indicator.

4. The method of claim 3, wherein the applying the gain filter further comprises determining a gain based on the confidence level and determining the gain filter based on the gain.

5. A system for tracking an object with an electronic device, the system comprising:
a processor configured to:
define a reference value based on a first average light intensity of pixels in a first region of a first image frame comprising the object;
determine a second average light intensity of pixels in a second region of a second image frame comprising the object, the second average light intensity of pixels being different than the first average light intensity of pixels, and the second image frame captured after the first image frame;
calculate a difference between the reference value of the first region in the first image frame and the determined second average light intensity of the second region in the second image frame;
redefine the reference value to produce a redefined reference value, based on the average light intensity of pixels in the second region of the second image frame, in response to the calculated difference being less than an intensity limit;
apply a gain filter to the region of the second image frame to produce a filtered image frame;
track the object using the pixels in the filtered image frame; and
use the redefined reference value for tracking the object in a third image frame, wherein the third image frame is captured after the second image frame.

6. The system of claim 5, wherein the processor is configured to apply the gain filter by calculating a variation indicator of the region based on current and historical parameters of the region.

7. The system of claim 6, wherein the current and historical parameters comprise, respectively, current and historical sizes of the region.

8. The system of claim 6, wherein the current and historical parameters comprise, respectively, current and historical locations of the region.

9. The system of claim 6, wherein the processor is configured to apply the gain filter by determining a confidence level based on the variation indicator.

10. The system of claim 9, wherein the processor is configured to apply the gain filter by determining a gain based on the confidence level and determining the gain filter based on the gain.

11. The system of claim 10, wherein the processor is further configured to track the object by adjusting the region of the second image frame based on the gain filter.

12. The system of claim 11, wherein the adjusting the region comprises adjusting the location of the region.

13. The system of claim 11, wherein the adjusting the region comprises adjusting the size of the region.

14. A system for tracking an object with an electronic device, the system comprising:
means for defining a reference value based on a first average light intensity of pixels in a first region of a first image frame comprising the object;
means for determining a second average light intensity of pixels in a second region of a second image frame comprising the object, the second average light intensity of pixels being different than the first average light intensity of pixels, and the second image frame captured after the first image frame;
means for calculating a difference between the reference value of the first region in the first image frame and the determined second average light intensity of the second region in the second image frame;
means for redefining the reference value to produce a redefined reference value, based on the average light intensity of pixels in the second region of the second image frame, in response to the calculated difference being less than an intensity limit; and
means for applying a gain filter to the region of the second image frame to produce a filtered image frame;
means for tracking the object using the pixels in the filtered image frame; and
means for using the redefined reference value for tracking the object in a third image frame, wherein the third image frame is captured after the second image frame.

15. The system of claim 14, wherein the means for applying a gain filter comprises:
means for calculating a variation indicator of the region based on current and historical parameters of the region; and
means for determining a confidence level based on the variation indicator.

16. The system of claim 15, wherein the means for applying a gain filter further comprises:
means for determining a gain based on the confidence level; and
means for determining the gain filter based on the gain.

17. The system of claim 16, further comprising means for tracking the object by adjusting the region of the second image frame based on the gain filter.

18. A non-transitory computer readable medium configured to store instructions that when executed cause a processor to:
define a reference value based on a first average light intensity of pixels in a first region of a first image frame comprising the object;
determine a second average light intensity of pixels in a second region of a second image frame comprising the object, the second average light intensity of pixels being different than the first average light intensity of pixels, and the second image frame captured after the first image frame;
calculate a difference between the reference value of the first region in the first image frame and the determined second average light intensity of the second region in the second image frame;
redefine the reference value to produce a redefined reference value based on the average light intensity of pixels in the second region of the second image frame, in response to determining the calculated difference being less than an intensity limit; and
apply a gain filter to the region of the second image frame to produce a filtered image frame;
track the object using the pixels in the filtered image frame; and
use the redefined reference value for tracking the object in a third image frame, wherein the third image frame is captured after the second image frame.

19. The computer readable medium of claim 18, wherein the applying the gain filter comprises:
calculating a variation indicator of the region based on current and historical parameters of the region; and
determining a confidence level based on the variation indicator.

20. The computer readable medium of claim 19, wherein the applying the gain filter further comprises:
determining a gain based on the confidence level; and
determining the gain filter based on the gain.

21. The computer readable medium of claim 20, wherein the instructions further cause the processor to track the object by adjusting the region of the second image frame based on the gain filter.

22. The method of claim 1, wherein the redefining of the reference value is in response to the difference being less than an intensity limit or in response to an accrued time satisfying a time threshold.

23. The method of claim 22, wherein the accrued time is an amount of time since defining or previously redefining the reference value.

24. The method of claim 1, wherein the tracking the object comprises adjusting the region of the second image frame based on the gain filter.

* * * * *